Oct. 13, 1936.  C. M. JOHNSON  2,056,938
ENGINE MOUNT
Filed Aug. 8, 1935   2 Sheets-Sheet 1
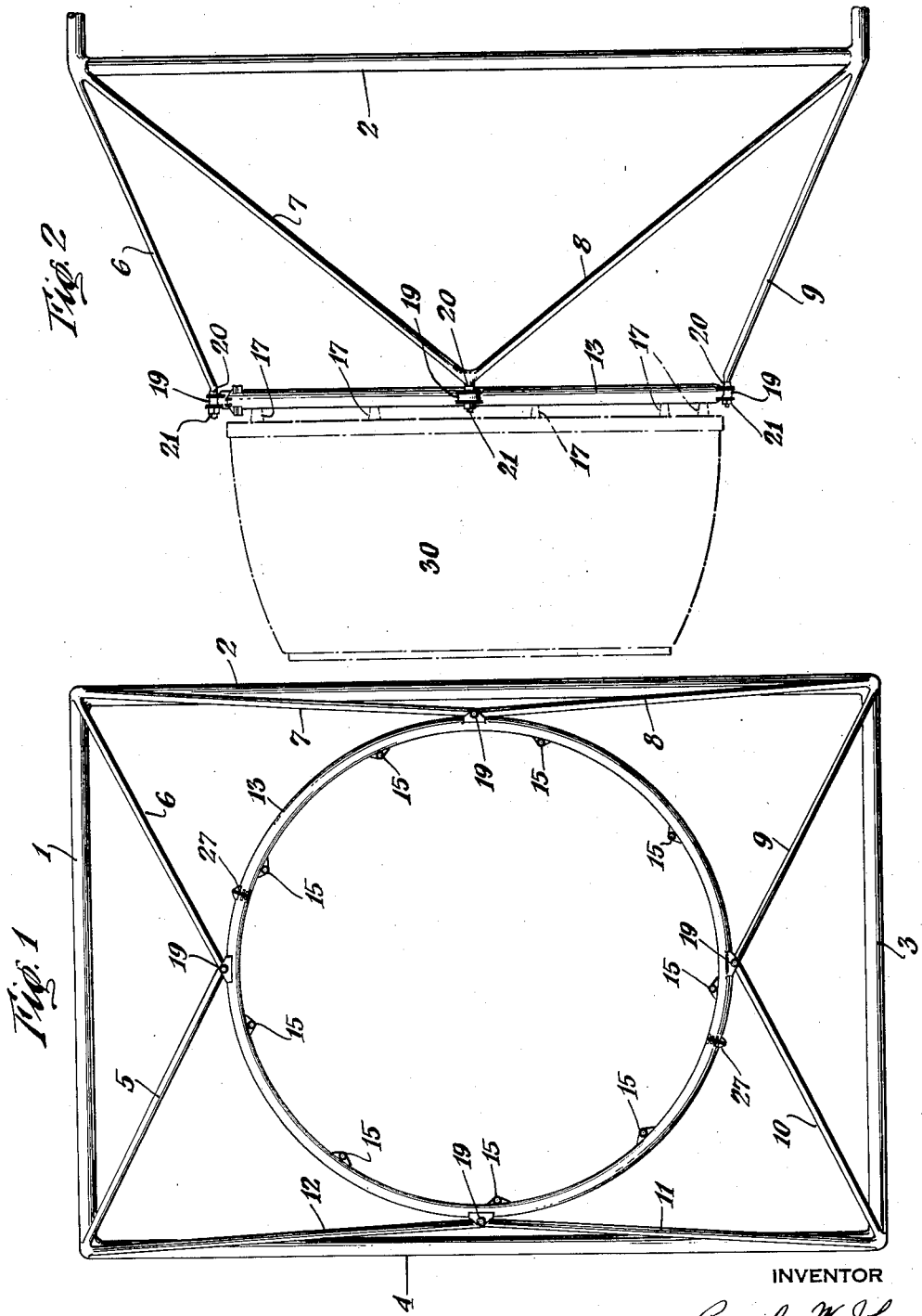
INVENTOR
Corydon W. Johnson Oct. 13, 1936.                    C. M. JOHNSON                    2,056,938
                                  ENGINE MOUNT
                               Filed Aug. 8, 1935                2 Sheets-Sheet 2
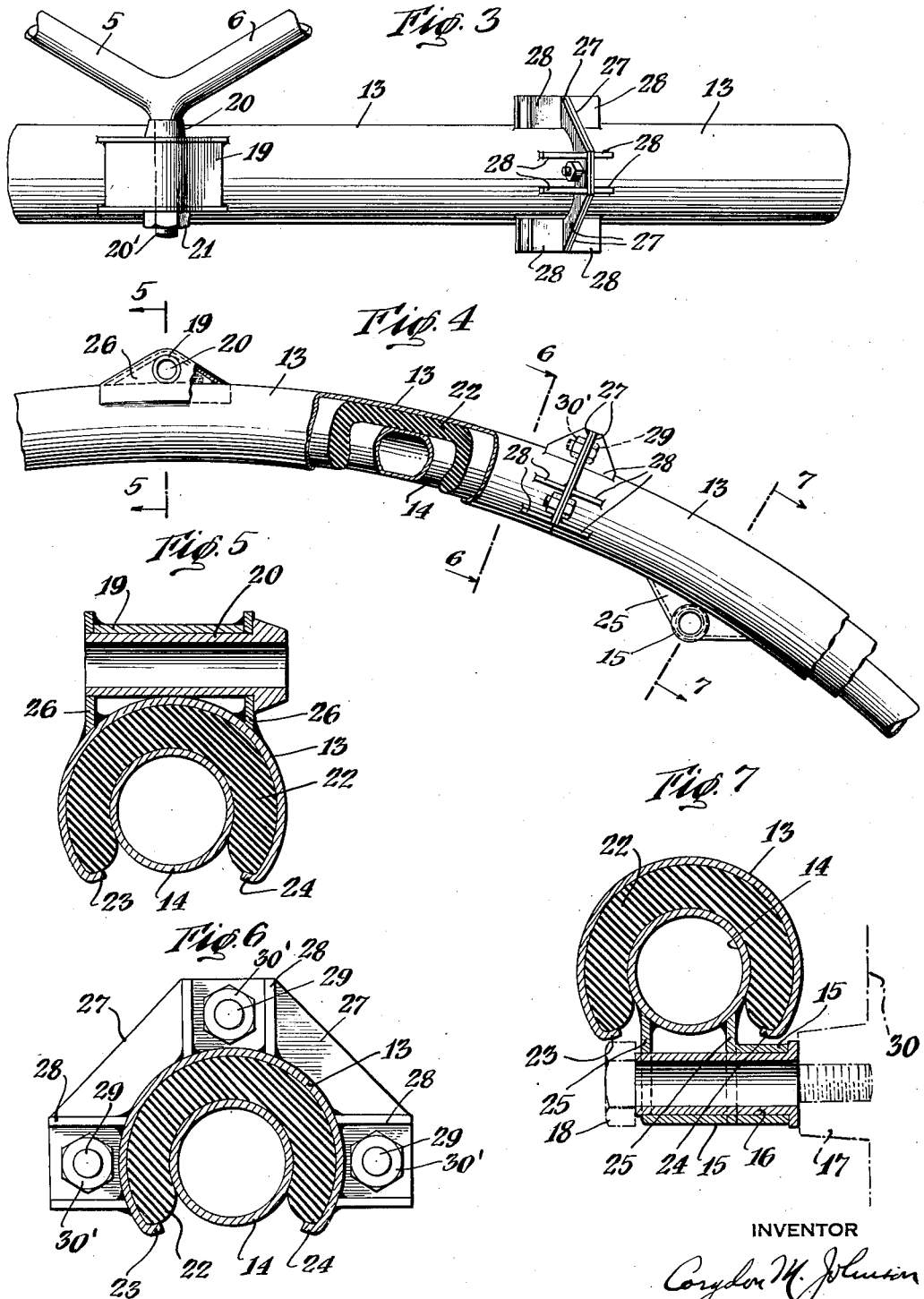
INVENTOR
Corydon M. Johnson Patented Oct. 13, 1936

2,056,938

UNITED STATES PATENT OFFICE 2,056,938

ENGINE MOUNT

Corydon M. Johnson, Freeport, N. Y.

Application August 8, 1935, Serial No. 35,310

2 Claims. (Cl. 248—5)

This invention relates in general to supporting and mounting means and has for one of its objects to provide a new and improved means for mounting an engine on an aircraft in such a manner as to minimize the transmission of engine vibration to the aircraft structure and the attending destructive wear caused thereby.

Arrangements of this general description have heretofore been in use and comprise shock absorbing devices to reduce the transmission of engine vibration to the airplane fuselage while the engine is carried in a ring mount at the forward end of the fuselage. However, these arrangements have uniformly made for a multiplicity of loose parts including circumferentially split or two part rings, long slender bolts with separate exposed shock absorbing members and adjustment nuts for equalizing and making uniform the absorbing characteristics of the mount throughout.

In order to overcome these and other disadvantages and to provide a satisfactory and practical engine mount it is an object of the invention to provide a mount in the form of a single self-contained unit in which no adjustments are necessary and in which the parts are reduced to a minimum and none of them loose parts.

Generally speaking the unit may comprise an inner hollow ring to which the engine may be directly bolted without the necessity of shock absorbing units being interposed therebetween. Arranged circumferentially of and exteriorly of but not completely enveloping this ring, is arranged an outer ring in spaced relation. The outer ring is directly connected to the longerons or metal fuselage struts without any shock absorbing means therebetween. The sole shock absorbing means constitutes a single resilient member or several segments interposed between the two rings and vulcanized to the outer surface of the inner ring and the inner surface of the outer ring. A limited space is provided between the flange of the inner ring and the straddling ends of the outer ring to permit relative rotation between the rings. The mount provides for simultaneous tension and compression of the single shock absorbing member under engine vibration, and the torsional vibrations are absorbed by shear of this member between the rings.

The exact nature of the invention and its advantages will become more apparent upon a further reading of the following specification and appended claims, and in the accompanying drawings, in which:

Figure 1 is a view in front elevation of an airplane fuselage showing the improved engine ring mount and the supporting fuselage struts.

Figure 2 is a view in side elevation of the same showing the engine mounted therein.

Figure 3 is a detail partial view of the engine mount in top plan.

Figure 4 is a detail partial view in front elevation, partially broken away, of the engine mount showing the inner and outer rings and the shock absorbing means.

Figure 5 is a view in section taken along line 5—5 of Figure 4 and enlarged in detail to show the means of connection of the outer ring to the fuselage.

Figure 6 is a view in section taken along line 6—6 of Figure 4 and enlarged in detail.

Figure 7 is a view in section taken along line 7—7 of Figure 4 and enlarged in detail to show the means of connection of the engine to the inner ring.

Referring more particularly to the drawings there is shown the front portion of a hollow metal tube airplane fuselage including such tubes as 1, 2, 3 and 4 to which are welded forwardly extending hollow tube struts 6 to 12 inclusive, for connection to and the support of an engine mount hollow tube ring.

The conventional construction is to employ a single ring and secure both the fuselage and the engine thereto. In the present construction it is proposed to employ two rings, one inside of the other, and mount the fuselage on the outer ring and the engine on the inner ring.

Accordingly an inner ring 14 is provided with a tubular bracket 15 to engage the bushing 16 of a hub 17, the engine 30 and held in place by a bolt 18. Nine of these inwardly extending brackets 15 are shown in Figure 1.

The outer incomplete hollow tube ring is provided with a hollow tube bracket 19 with bracing ribs 26, the bracket receiving the bushing 20 for the extension 20' of a fuselage strut which is screw threaded and fastened by means of a nut 21. Four of these brackets 19 are shown in Figure 1 for connecting the remaining fuselage struts to the outer ring 13.

Between the two spaced rings is provided a resilient shock absorbing mass 22 of rubber or like material, and which may be in a single piece or a plurality of segments. The rubber mass extends circumferentially about the inner ring and fills the space between the two circumferentially arranged rings and is vulcanized to the inner surface of the outer ring and to the outer surface of the inner ring.

The outer ring 13 is not a complete tube in that its sides terminate in inwardly bent edges 23 and 24. As shown in Figure 7 there edges are normally spaced from the bracket 15 and the bracing ribs 25 extending from the inner ring. This allows for a limited fore and aft relative rotation between the inner and outer ring subject to the shearing action of the resilient member 22 secured to both of the rings.

For ease in assembly the outer ring is shown split transversely at two points in its circumference. The adjacent ends have flanges 27 with bracing ribs 28, the flanges being secured together by bolts 29 and nuts 30'. Thus the rubber 22 may be placed in the outer ring and as the latter is placed about the inner ring and the two halves of the outer ring bolted together the rubber is put under initial compression. The rubber is vulcanized to the rings so that relative fore and aft rotation between the rings will be resisted by the rubber.

From the foregoing it will be seen that there has been provided a simple single self contained unit having resiliency in all directions for effectively absorbing all of the engine vibrations. The radial loads and thrust loads applied by the engine to the inner ring, subject the resilient member 22 to tension and compresison stresses at radially opposite points simultaneously. The resilient member being securely fastened to both the inner and outer rings permits of a perfect bond and the joining of the two parts of the outer ring so as to put the resilient material under initial compression develops the full strength possible of the resilient material.

The mount reduces the number of parts to a minimum and involves no loose parts or long thin breakable or bendable securing bolts or other parts susceptible to wear. The outer ring is directly connected, in metal to metal contact, to the fuselage struts, and the inner ring is directly connected, in metal to metal contact, to the engine so as to reduce the possibility of misalignment. Both the inner and outer tubular metal rings are designed and constructed as efficient members to withstand the maximum torsional stresses. All of the attachment holes for the connection of the fuselage struts to the outer ring and the engine to the inner ring are accurately jig located so as to obtain and maintain perfect alignment. All loads from whatever source are evenly distributed in the metal-members of the ring assembly and thus internal stresses at any one point are maintained at a minimum. The mount is particularly adapted for supporting any radial engine on any type of aircraft.

I claim:

1. Means for mounting an engine on an airplane for absorbing and preventing the transmission of the vibrations of said engine to said airplane, said means comprising a self-contained unit including a pair of relatively movable rigid members with shock absorbing means therebetween, one of said rigid members being secured to said engine and the other member constituting a structural part of said airplane, said rigid members comprising an inner and an outer spaced metallic hollow tube substantially in the form of a ring, said shock absorbing means comprising a resilient and compressible mass bonded to each of said members.

2. Means for mounting an engine on an airplane for absorbing and preventing the transmission of the vibrations of said engine to said airplane, said means comprising a self-contained unit including a pair of relatively movable rigid members with shock absorbing means therebetween, one of said rigid members being secured to said engine and the other member constituting a structural part of said airplane, said rigid members comprising an inner and an outer spaced metallic hollow tube substantially in the form of a ring, said shock absorbing means comprising a resilient and compressible mass bonded to each of said members said structural part of said airplane constituting the outermost of said tubes and being substantially U-shaped in cross section.

CORYDON M. JOHNSON.